United States Patent
Jamal et al.

(10) Patent No.: US 12,049,000 B2
(45) Date of Patent: Jul. 30, 2024

(54) JOINT STRUCTURE FOR ROBOT AND ROBOT INCLUDING THE SAME

(71) Applicants: Hyundai Motor Company, Seoul (KR); Kia Corporation, Seoul (KR)

(72) Inventors: Muhammad Zahak Jamal, Gyeonggi-do (KR); Dong Hyun Lee, Gyeonggi-do (KR); Hyo Seung Han, Gyeonggi-do (KR); Suk Hyung Jang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 376 days.

(21) Appl. No.: 17/521,451

(22) Filed: Nov. 8, 2021

(65) Prior Publication Data

US 2022/0297318 A1  Sep. 22, 2022

(30) Foreign Application Priority Data

Mar. 19, 2021 (KR) .................. 10-2021-0036201

(51) Int. Cl.
*B25J 15/08* (2006.01)
(52) U.S. Cl.
CPC .................................... *B25J 15/08* (2013.01)
(58) Field of Classification Search
CPC ...... B25J 15/0009; B25J 15/08; B25J 9/1075; B25J 15/022
USPC .................................................. 294/111, 213
See application file for complete search history.

(56) References Cited

U.S. PATENT DOCUMENTS

| | | | | |
|---|---|---|---|---|
| 4,921,293 A | * | 5/1990 | Ruoff | A61F 2/583 623/64 |
| 5,373,747 A | * | 12/1994 | Ogawa | B25J 15/0009 73/862.041 |
| 5,647,723 A | * | 7/1997 | Rush | B25J 15/0009 901/29 |
| 7,615,956 B2 | * | 11/2009 | Tsusaka | B62D 57/032 901/17 |
| 8,483,880 B2 | * | 7/2013 | de la Rosa Tames | B25J 15/0009 600/595 |
| 11,597,099 B2 | * | 3/2023 | Zappatore | B25J 15/08 |
| 2010/0121222 A1 | * | 5/2010 | Abdallah | B25J 15/0009 600/587 |
| 2016/0136822 A1 | | 5/2016 | Chang et al. | |
| 2017/0155032 A1 | * | 6/2017 | Chiba | B25J 15/0009 |
| 2023/0256618 A1 | * | 8/2023 | Park | B25J 9/1612 700/250 |

OTHER PUBLICATIONS

Li, Sheng. "Perception of individual finger forces during multi-finger force production tasks." Neuroscience letters 209.3 (2006) 239-243.

(Continued)

*Primary Examiner* — Paul T Chin
(74) *Attorney, Agent, or Firm* — Fox Rothschild LLP (57) ABSTRACT

Provided is a joint structure for a robot including: a body part; a link structure connected to an upper portion of the body part and including multiple links; a sensor unit provided on one end of the link structure; a first wire having one end connected to the sensor unit; and an actuator fixed to one side of the body part and connected to the other end of the first wire to move the other end of the first wire in a vertical direction, wherein the sensor unit measures tension applied to the first wire.

17 Claims, 7 Drawing Sheets

(56) References Cited

OTHER PUBLICATIONS

Jeong, Seok Hwan et al. "Design of a miniature force sensor based on photointerrupter for robotic hand" Sensors and Actuators A: Physical vol. 269, Jan. 1, 2018, pp. 444-453.

* cited by examiner

JOINT STRUCTURE FOR ROBOT AND ROBOT INCLUDING THE SAME

CROSS-REFERENCE TO RELATED APPLICATION

This application is based on and claims the benefit of priority to Korean Patent Application No. 10-2021-0036201, filed on Mar. 19, 2021, in the Korean Intellectual Property Office, the disclosure of which is incorporated herein in its entirety by reference.

TECHNICAL FIELD

The present disclosure relates to a joint structure for a robot and a robot including the same.

BACKGROUND

As research on robots has increased, research on robots that can mimic the human motions is being actively conducted. One of the human motions required for robots is to mimic the motion of a human finger.

In order for the robot to mimic the motion of the human finger, the robot needs to be equipped with components corresponding to the muscles, tendons, and fingers of a human body. In addition, the robot needs to be equipped with a sensor unit corresponding to a sensory receptor that can deliver sensations in response to external stimuli so that a robotic finger, like the human finger, may resist an external force to keep the original shape of the finger or be actuated to grip a predetermined object.

SUMMARY

The present disclosure has been made to solve the above-mentioned problems occurring in the prior art while advantages achieved by the prior art are maintained intact.

An aspect of the present disclosure provides a joint structure for a robot that can effectively mimic human finger motion and efficiently respond to external forces.

According to an aspect of the present disclosure, a joint structure for a robot may include: a body part; a link structure connected to an upper portion of the body part and including multiple links; a sensor unit provided on one end of the link structure; a first wire having one end connected to the sensor unit; and an actuator fixed to one side of the body part and connected to the other end of the first wire to move the other end of the first wire in a vertical direction, wherein the sensor unit may measure tension applied to the first wire.

The actuator may be mounted in the inside of the body part, and as the tension applied by the actuator to the first wire increases, the link structure may be bent toward the body part.

The link structure may include the multiple links connected in series in one direction, and the first wire may extend through the inside of the multiple links.

The sensor unit may be provided inside an outermost link of the multiple links.

The joint structure may further include: a second wire having one end connected to the link structure; and a reaction force providing portion fixed to the other side of the body part, connected to the other end of the second wire, and providing a force to pull the second wire downwardly.

The reaction force providing portion may include a spring member.

The actuator and the reaction force providing portion may face each other with the body part disposed therebetween.

The first wire and the second wire may face each other with the link structure disposed therebetween.

The second wire may be connected to the outermost link of the multiple links.

The sensor unit may convert an analog signal generated by a change in the tension of the first wire into a digital signal.

The sensor unit may include: a signal generating unit fixed to one end of the first wire and generating the analog signal; and a signal processing unit processing the signal by converting the analog signal received from the signal generating unit into the digital signal. The first wire may extend through an internal space formed in the signal generating unit, and the analog signal may be generated by a change in thickness of one component of the signal generating unit due to the change in the tension of the first wire.

The sensor unit may further include a printed circuit board (PCB) provided under the signal generating unit and the signal processing unit, and the signal generating unit and the signal processing unit may be attached to the PCB.

The first wire may extend through the PCB.

The signal generating unit may include: an electrode attached to the PCB; a conductive plate spaced apart upwardly from the electrode; and a dielectric layer interposed between the electrode and the conductive plate, and attached to the electrode and the conductive plate, and the analog signal may be generated by a change in thickness of the dielectric layer.

The signal generating unit may further include a pressure plate provided on the conductive plate, and one end of the first wire may be connected to the pressure plate.

When an external force acts on the link structure in a direction in which the link structure is extended from the body part, the actuator may be controlled to increase the tension applied to the first wire.

When an object is provided in a direction in which the link structure is bent, the actuator may be controlled to increase the tension applied to the first wire so that the link structure may be bent toward the body part to grip the object.

According to another aspect of the present disclosure, a robot may include a robotic arm, wherein the robotic arm may include a joint structure for performing a finger function of the robotic arm. The joint structure may include: a body part; a link structure connected to an upper portion of the body part and including multiple links; a sensor unit provided on one end of the link structure; a first wire having one end connected to the sensor unit; and an actuator fixed to one side of the body part and connected to the other end of the first wire to move the other end of the first wire in a vertical direction, and the sensor unit may measure tension applied to the first wire.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
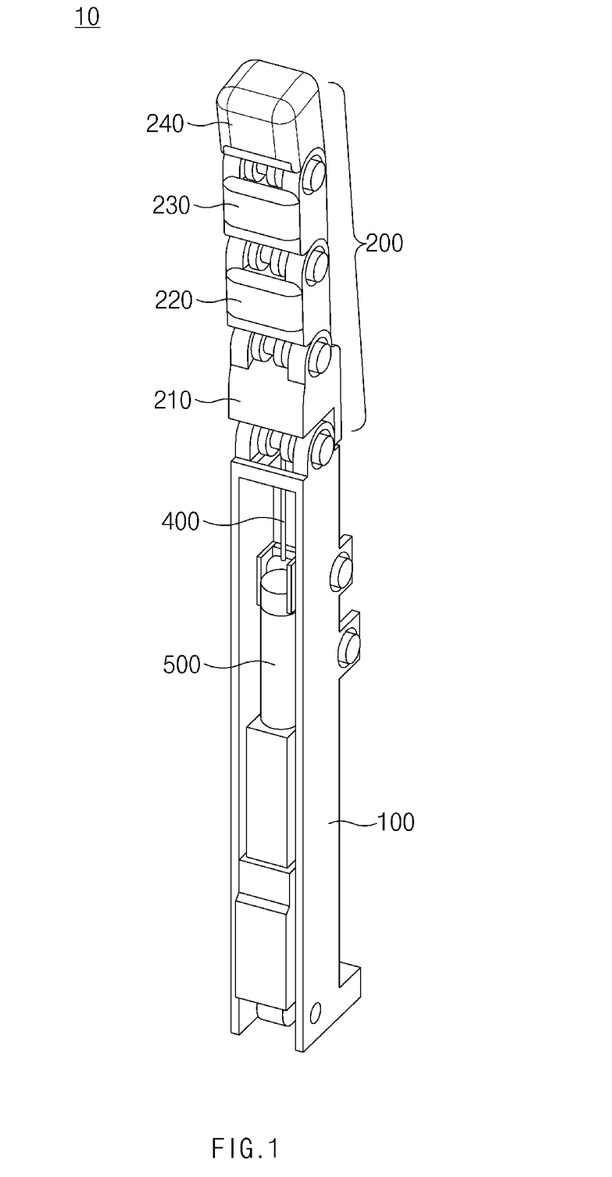
FIG. 1 illustrates a perspective view of a joint structure for a robot according to an exemplary embodiment of the present disclosure when a link structure of the joint structure is extended (straightened)
Figure 2:
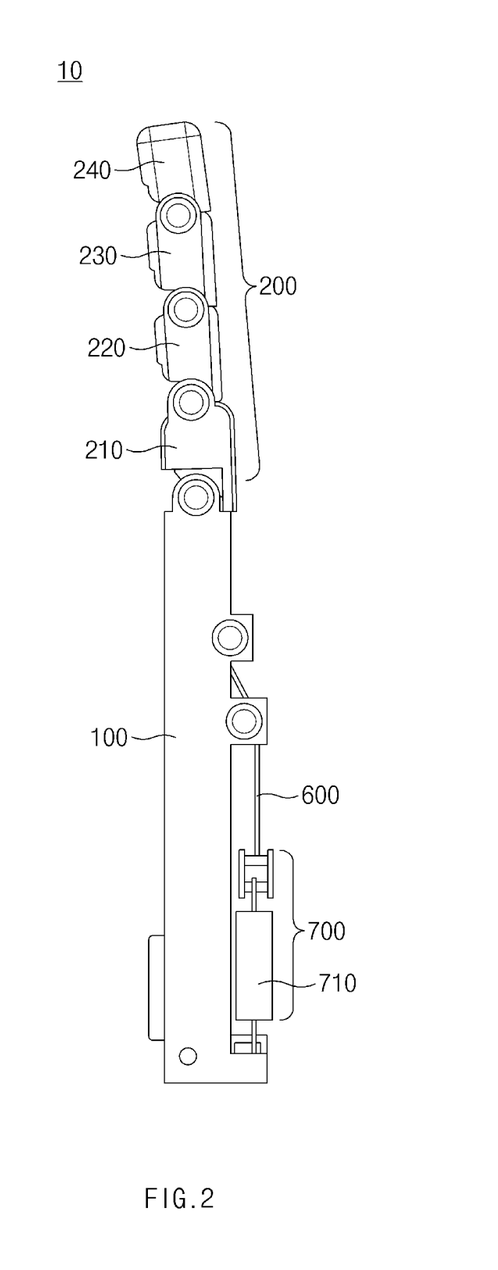
FIG. 2 illustrates a side view of a joint structure for a robot according to an exemplary embodiment of the present disclosure when a link structure of the joint structure is extended.
Figure 3:
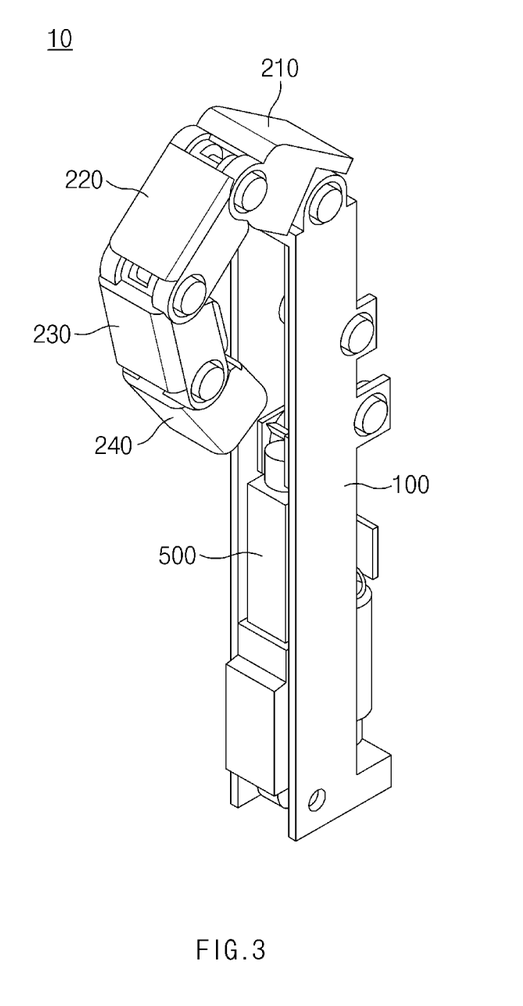
FIG. 3 illustrates a perspective view of a joint structure for a robot according to an exemplary embodiment of the present disclosure when a link structure of the joint structure is bent.
Figure 4:
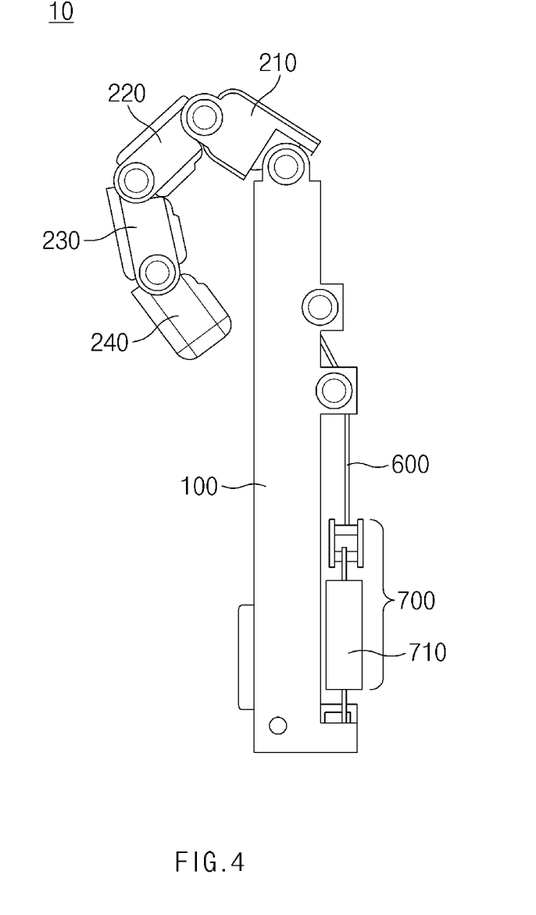
FIG. 4 illustrates a side view of a joint structure for a robot according to an exemplary embodiment of the present disclosure when a link structure of the joint structure is bent.
Figure 5:
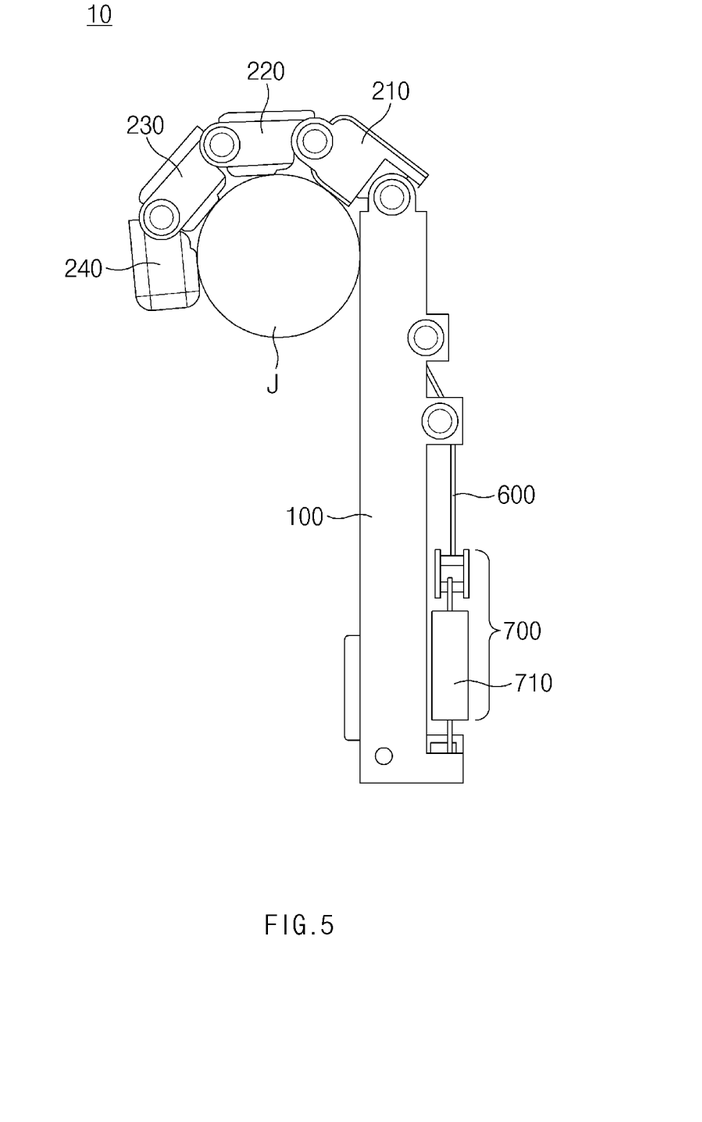
FIG. 5 illustrates a side view of a joint structure for a robot according to an exemplary embodiment of the present disclosure when the joint structure grips an object.

Hereinafter, a joint structure for a robot and a robot including the same according to exemplary embodiments of the present disclosure will be described in detail with reference to the accompanying drawings.
Joint Structure for Robot FIG. 1 illustrates a perspective view of a joint structure for a robot according to an exemplary embodiment of the present disclosure when a link structure of the joint structure is extended (straightened), and FIG. 2 illustrates a side view of a joint structure for a robot according to an exemplary embodiment of the present disclosure when a link structure of the joint structure is extended. In addition, FIG. 3 illustrates a perspective view of a joint structure for a robot according to an exemplary embodiment of the present disclosure when a link structure of the joint structure is bent, and FIG. 4 illustrates a side view of a joint structure for a robot according to an exemplary embodiment of the present disclosure when a link structure of the joint structure is bent. FIG. 5 illustrates a side view of a joint structure for a robot according to an exemplary embodiment of the present disclosure when the joint structure grips an object.

The joint structure for a robot according to exemplary embodiments of the present disclosure may constitute a finger of a robotic arm of a robot. Thus, the joint structure for a robot may be designed to mimic the motion of a human finger. The joint structure for a robot may be widely applied to elements/parts of the robot that require the movement of joints, in addition to the robotic finger.

Referring to FIGS. 1 to 4, a joint structure 10 for a robot according to an exemplary embodiment of the present disclosure may include a body part 100 provided in a lower portion of the joint structure 10 for a robot, and a link structure 200 connected to an upper portion of the body part 100 and including multiple links 210, 220, 230, and 240.

The body part 100 which is fixed may form a main body of the joint structure 10 for a robot. The link structure 200 may be moved by a wire to be described below so that it may be bent toward the body part 100 or be extended in a direction away from the body part 100. To this end, the link structure 200 may include the multiple links 210, 220, 230, and 240. As illustrated in FIGS. 1 to 4, the multiple links 210, 220, 230, and 240 may be connected in series in one direction. Around an area where two links are connected to each other, one link may rotate in a vertical direction with respect to the other link.

As described above, the joint structure 10 for a robot according to an exemplary embodiment of the present disclosure may be designed to mimic the motion of the human finger. However, the number of links constituting the link structure 200 may be greater than the number of knuckles (joints) of the human finger so that the movement and function of the link structure 200 may be performed more smoothly. As illustrated in FIGS. 1 to 4, the link structure 200 may include a first link 210 connected to an upper end portion of the body part 100, a second link 220 connected to an upper end portion of the first link 210, a third link 230 connected to an upper end portion of the second link 220, and a fourth link 240 connected to an upper end portion of the third link 230, and the link structure 200 may have one more link than the knuckles of the human finger. However, the number of links constituting the link structure 200 is not limited thereto.

Meanwhile, the joint structure 10 for a robot according to an exemplary embodiment of the present disclosure may further include a sensor unit provided on one end of the link structure 200, a first wire 400 having one end connected to the sensor unit, and an actuator 500 fixed to one side of the body part 100 and connected to the other end of the first wire 400 to move the other end of the first wire 400 in a vertical direction.

To be described below, the sensor unit may measure tension applied to the first wire 400. According to an exemplary embodiment of the present disclosure, the tension of the first wire 400 measured by the sensor unit may be used to control the movement of the link structure 200. More specifically, the sensor unit may be disposed inside the outermost link of the multiple links 210, 220, 230, and 240 constituting the link structure 200. Referring to FIGS. 1 to 4, when the link structure 200 is made up of four links, the sensor unit may be disposed inside the fourth link 240 located at the outermost end of the link structure.

Meanwhile, the actuator 500 may be mounted in an internal space of the body part 100, and the first wire 400 may be provided to extend through the inside of the multiple links. That is, referring to FIGS. 1 to 4, the first wire 400 may extend through an internal space of each of the first link 210, the second link 220, the third link 230, and the fourth link 240. Thus, relative positions of the multiple links 210, 220, 230, and 240 may be constrained according to the movement of the first wire 400.

According to an exemplary embodiment of the present disclosure, as the tension applied by the actuator 500 to the first wire 400 increases, the link structure 200 may be bent toward the body part 100.

That is, referring to FIGS. 1 and 2, when the actuator 500 moves upwardly, the tension applied to the other end of the first wire 400 connected to the actuator 500 may be relatively low. Here, the multiple links 210, 220, 230, and 240 constituting the link structure 200 may be sequentially arranged upward in a direction away from the body part 100.

Then, when the actuator 500 moves downwardly, the other end of the first wire 400 may move downwardly and the tension applied to the first wire 400 may increase. Here, as illustrated in FIGS. 3 and 4, the multiple links 210, 220, 230, and 240 constituting the link structure 200 may move downwardly toward the body part 100, and accordingly the link structure 200 may be bent toward the body part 100.

Thus, according to an exemplary embodiment of the present disclosure, the tension of the first wire 400 may be controlled by the actuator 500 so that the movement of the link structure 200 may be controlled. In particular, the tension of the first wire 400 may be measured by the sensor unit connected to the first wire 400, and the movement of the link structure 200 may be efficiently controlled depending on the tension of the first wire 400 measured by the sensor unit. For example, the sensor unit may be configured to mimic a sensory receptor of the human finger.

Referring to FIGS. 1 to 4, the joint structure 10 for a robot according to an exemplary embodiment of the present disclosure may further include a second wire 600 having one end connected to the link structure 200, and a reaction force providing portion 700 fixed to the other side of the body part 100, connected to the other end of the second wire 600, and providing a force to pull the second wire 600 downwardly. More preferably, the reaction force providing portion 700 may include a spring member 710.

More specifically, the actuator 500 and the reaction force providing portion 700 may face each other with the body part 100 disposed therebetween, and the first wire 400 and the second wire 600 may face each other with the link structure 200 disposed therebetween.

According to an exemplary embodiment of the present disclosure, the tension applied to the first wire 400 and the tension applied to the second wire 600 may act downwardly on the link structure 200. As described above, since the first wire 400 and the second wire 600 are provided with the body part 100 disposed therebetween, the tension applied to the first wire 400 may act in a direction in which the link structure 200 is bent toward the body part 100, and the tension applied to the second wire 600 may act in a direction in which the link structure 200 is extended away from the body part 100. Thus, the multiple links 210, 220, 230, and 240 of the link structure 200 may be in respective positions in which a rotational force provided to the link structure 200 by the tension applied to the first wire 400 and a rotational force provided to the link structure 200 by the tension applied to the second wire 600 are balanced with each other.

For example, when the link structure 200 is bent toward the body part 100, the actuator 500 may move downwardly and the first wire 400 may also move downwardly, and accordingly the tension applied to the first wire 400 may increase. Thus, the link structure 200 may have a bent shape with respect to the body part 100. However, as the link structure 200 is bent toward the body part 100, the second wire 600 may move away from the reaction force providing portion 700, and accordingly an elastic force of the spring member 710 provided in the reaction force providing portion 700 may increase, and the tension of the second wire 600 may also increase. Thus, the shape of the link structure 200 may be determined in a position of equilibrium of the rotational force provided to the link structure 200 by the tension applied to the first wire 400 and the rotational force provided to the link structure 200 by the tension applied to the second wire 600. Meanwhile, although not shown, the end of the second wire 600 may be connected to the outermost link of the multiple links 210, 220, 230, and 240. For example, as illustrated in FIGS. 1 to 4, when the link structure 200 is made up of the first to fourth links 210, 220, 230, and 240, the end of the second wire 600 may be connected to the fourth link 240. Unlike such a connection, however, the end of the second wire 600 may also be connected to any one of the other links 210, 220, and 230. According to an exemplary embodiment of the present disclosure, the first wire 400 and the second wire 600 may be configured to mimic tendons of the human body, and the actuator 500 and the reaction force providing portion 700 may be configured to mimic muscles that pull the tendons.

Figure 6:
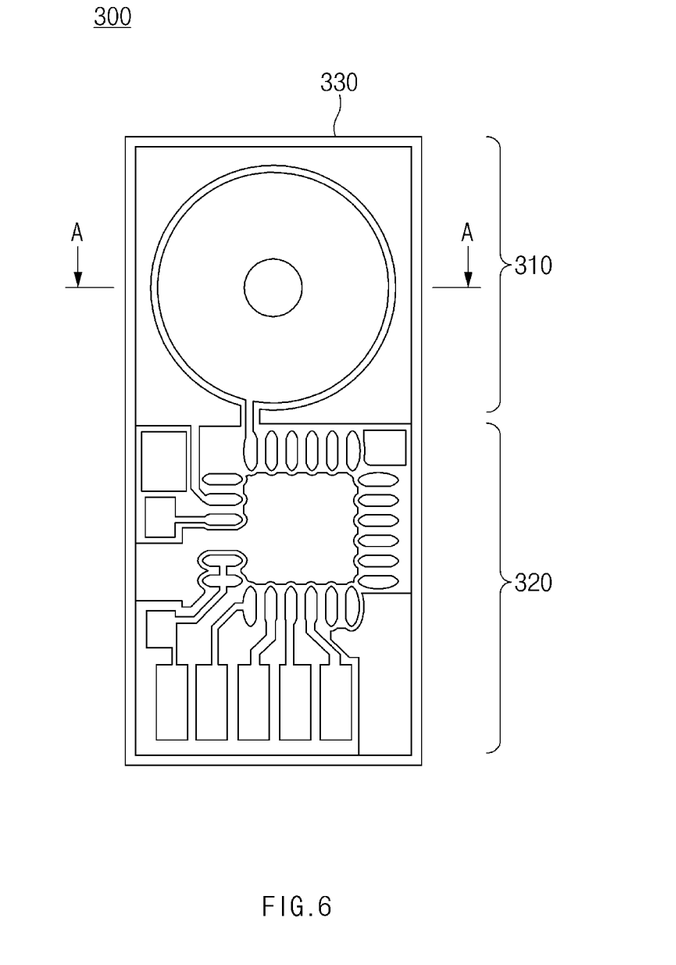
FIG. 6 illustrates a plan view of a sensor unit provided in a joint structure for a robot according to an exemplary embodiment of the present disclosure.
Figure 7:
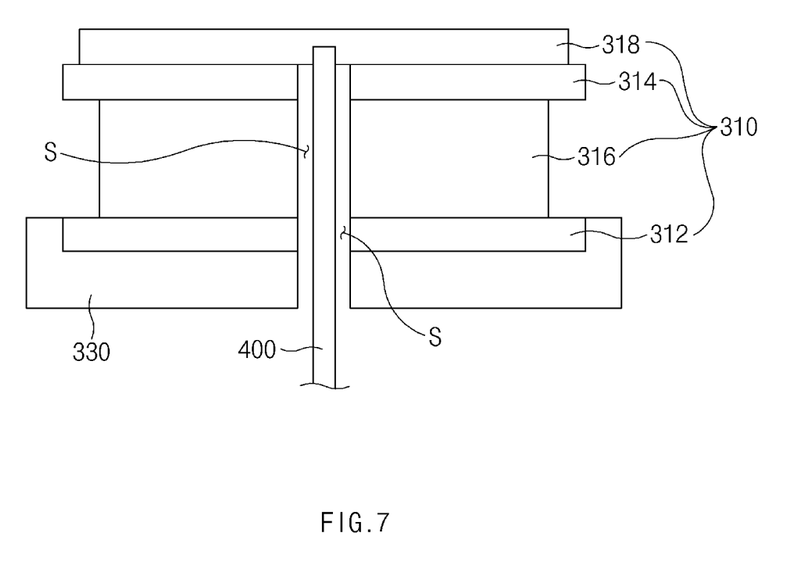
FIG. 7 illustrates a cross-sectional view of the sensor unit illustrated in FIG. 6, taken along line A-A.

FIG. 6 illustrates a plan view of a sensor unit provided in the joint structure for a robot according to an exemplary embodiment of the present disclosure, and FIG. 7 illustrates a cross-sectional view of the sensor unit, taken along line A-A.

The sensor unit 300 provided in the joint structure 10 for a robot according to an exemplary embodiment of the present disclosure may convert an analog signal generated by a change in the tension of the first wire 400 into a digital signal.

To this end, the sensor unit 300 may include a signal generating unit 310 fixed to one end of the first wire 400 and generating the analog signal, and a signal processing unit 320 processing the signal by converting the analog signal received from the signal generating unit 310 into the digital signal. The digital signal converted by the signal processing unit 320 may be 16-bit data, but the type of data is not limited thereto.

Here, the first wire 400 may extend through an internal space S formed in the signal generating unit 310, and the analog signal may be generated by a change in thickness of one component of the signal generating unit 310 due to a change in the tension of the first wire 400.

As described above, the tension of the first wire 400 may be changed by the actuator 500, and when the tension of the first wire 400 changes, a force acting on the signal generating unit 310 to which the first wire 400 is fixed may also change. For example, when the first wire 400 is fixed to one component 318 of the signal generating unit 310, the magnitude of a force that the signal generating unit 310 receives as the first wire 400 moves downwardly may also change.

More preferably, according to an exemplary embodiment of the present disclosure, the analog signal may be generated by a change in the thickness of one component of the signal generating unit 310 due to a change in the tension of the first wire 400. That is, i) change in the tension of the first wire 400 by the actuator 500, ii) change in the force applied by the first wire 400 to the signal generating unit 310, iii) change in the thickness of one component of the signal generating unit 310, and iv) the generation of the analog signal may occur sequentially.

In particular, according to an exemplary embodiment of the present disclosure, the first wire 400 may be directly fixed to the signal generating unit 310 through the internal space S without any separate component, and thus the sensor unit 300 may be manufactured without a separate fixing member. The structure of the sensor unit may be simplified, which may make the sensor unit compact.

Referring to FIGS. 6 and 7, the sensor unit 300 may further include a printed circuit board (PCB) 330 provided under the signal generating unit 310 and the signal processing unit 320. The signal generating unit 310 and the signal processing unit 320 may be attached to the PCB 330. For example, the signal generating unit 310 and the signal processing unit 320 may be attached to a top surface of the PCB 330.

Here, the first wire 400 may extend through the PCB 330. Thus, the first wire 400 may extend through the internal space S of the signal generating unit 310 through the PCB 330 and then be fixed to one component 318 of the signal generating unit 310.

Meanwhile, according to an exemplary embodiment of the present disclosure, the signal generating unit 310 of the sensor unit 300 may have a stacked structure in which a plurality of components are stacked. More specifically, the signal generating unit 310 may include an electrode 312 attached to the PCB 330, a conductive plate 314 spaced apart upwardly from the electrode 312, and a dielectric layer 316 interposed between the electrode 312 and the conductive plate 314 and attached to the electrode 312 and the conductive plate 314. Here, the analog signal may be generated by a change in thickness of the dielectric layer 316.

According to an exemplary embodiment of the present disclosure, the electrode 312, the conductive plate 314, and the dielectric layer 316 may be assembled to serve as a capacitor. That is, the electrode 312 and the conductive plate 314 with the dielectric layer 316 interposed therebetween may be charged with an electric charge. Hereinbelow, the amount of electric charge charged in the capacitor will be referred to as "electric charge Q".

Meanwhile, the electric charge Q of the capacitor may be proportional to a potential difference between plates, that is, a potential difference V between the electrode 312 and the conductive plate 314, and be proportional to an electrostatic capacity C of the capacitor. In addition, the electrostatic capacity may be proportional to areas of the plates, that is, areas of the electrode 312 and the conductive plate 314, and be inversely proportional to a gap between the plates, that is, a gap between the electrode 312 and the conductive plate 314. Here, the gap between the electrode 312 and the conductive plate 314 may correspond to the thickness of the dielectric layer 316.

According to an exemplary embodiment of the present disclosure, the analog signal generated by the signal generating unit 310 of the sensor unit 300 may be generated by the change in the thickness of the dielectric layer 316. More specifically, the analog signal may be generated by a change in the electrostatic capacity of the signal generating unit 310 due to the change in the thickness of the dielectric layer 316.

Referring to FIG. 7, the signal generating unit 310 of the sensor unit 300 may further include a pressure plate 318 provided on the conductive plate 314. Here, one end of the first wire 400 may be connected to the pressure plate 318. For example, the pressure plate 318 may be a washer.

As described above, when the first wire 400 is fixed to the pressure plate 318, and the tension of the first wire 400 changes, a force of the pressure plate 318 pressing the dielectric layer 316 through the conductive plate 314 may change accordingly, and such a change in the pressing force may result in the change in the thickness of the dielectric layer 316. In accordance with the change in the electrostatic capacity due to the change in the thickness of the dielectric layer 316, the analog signal may be transmitted to the signal processing unit 320. However, unlike the embodiment illustrated in FIG. 7, the sensor unit 300 may not include the pressure plate 318, and one end of the first wire 400 may be directly connected to the conductive plate 314. In this case, the conductive plate 314 may also serve as the pressure plate 318.

In addition, although not shown, the signal generating unit 310 may further include a shield portion between the electrode 312 and the PCB 330. The shield portion may be provided to prevent an unintended accumulation of electric charge in the other area of the capacitor except for the electrode 312, the conductive plate 314, and the dielectric layer 316 of the capacitor. For example, the shield portion may be an AC shield for preventing the generation of parasitic capacitance.

Meanwhile, according to an exemplary embodiment of the present disclosure, the electrode 312 may be inserted into the inside of the PCB 330. For example, as illustrated in FIG. 7, a top surface of the electrode 312 may be flush with the top surface of the PCB 330.

In addition, according to an exemplary embodiment of the present disclosure, the dielectric layer 316 may include a conductive filler and a resin. Thus, the thickness of the dielectric layer 316 may be significantly changed by an external force. That is, as the tension of the first wire 400 changes, the change in the thickness of the dielectric layer 316 may be maximized, and accordingly the magnitude of the analog signal may also increase, and the sensitivity of the sensor unit 300 may also be remarkably improved.

Based on the above description, the operating method of the joint structure 10 for a robot according to an exemplary embodiment of the present disclosure will be described below.

In order that the link structure 200 in the joint structure 10 for a robot may be bent, the actuator 500 may move downwardly. Accordingly, the first wire 400 may also move downwardly, and the tension applied to the first wire 400 may increase. Thus, the link structure 200 may have a bent shape with respect to the body part 100.

Meanwhile, when an external force acts on the link structure 200 in a state in which the link structure 200 has a predetermined shape, the tension applied to the first wire 400 may be controlled so that the link structure 200 may maintain the predetermined shape. For example, when the external force acts on the link structure 200 in a direction in which the link structure 200 is extended from the body part 100, the actuator 500 may be controlled to increase the tension applied to the first wire 400. On the contrary, when the external force acts on the link structure 200 in a direction in which the link structure 200 is bent toward the body part 100, the actuator 500 may be controlled to decrease the tension applied to the first wire 400.

According to an exemplary embodiment of the present disclosure, a predetermined object J may be gripped by the link structure 200. That is, referring to FIG. 5, when the object J is provided in the direction in which the link structure 200 is bent, the actuator 500 may be controlled to increase the tension applied to the first wire 400 so that the link structure 200 may be bent toward the body part 100 to grip the object J. On the contrary, when the link structure 200 grips the object J, the actuator 500 may be controlled to decrease the tension applied to the first wire 400 so that the link structure 200 may be extended in a direction away from the body part 100 to release the object J.

Robot

With reference to the above description and the accompanying drawings, a robot according to exemplary embodiments of the present disclosure may include a robotic arm. Here, the robotic arm may include the joint structure 10 for performing a finger function of the robotic arm.

The joint structure 10 for a robot may include the body part 100, the link structure 200 connected to the upper portion of the body part 100 and including the multiple links 210, 220, 230, and 240, the sensor unit 300 provided on one end of the link structure 200, the first wire 400 having one end connected to the sensor unit 300, and the actuator 500 fixed to one side of the body part 100 and connected to the other end of the first wire 400 to move the other end of the first wire 400 in the vertical direction. Here, the sensor unit 300 may measure the tension applied to the first wire 400.

With reference to the accompanying drawings, the above description of the joint structure 10 for a robot according to exemplary embodiments of the present disclosure may also be applied to the robot according to exemplary embodiments of the present disclosure. Thus, a detailed description of the joint structure 10 provided in the robot according to exemplary embodiments of the present disclosure will be omitted.

As set forth above, the joint structure for a robot according to exemplary embodiments of the present disclosure can effectively mimic human finger motion and efficiently respond to external forces.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A joint structure for a robot, the joint structure comprising:
    a body part;
    a link structure connected to an upper portion of the body part and including multiple links;
    a sensor unit provided on one end of the link structure;
    a first wire having one end connected to the sensor unit;
    an actuator fixed to one side of the body part and connected to the other end of the first wire to move the other end of the first wire in a vertical direction,
    a second wire having one end connected to the link structure; and
    a reaction force providing portion fixed to the other side of the body part, connected to the other end of the second wire, and providing a force to pull the second wire downwardly,
    wherein the sensor unit measures tension applied to the first wire.

2. The joint structure according to claim 1, wherein the actuator is mounted in the inside of the body part, and as the tension applied by the actuator to the first wire increases, the link structure is bent toward the body part.

3. The joint structure according to claim 2, wherein the link structure includes the multiple links connected in series in one direction, and
    the first wire extends through the inside of the multiple links.

4. The joint structure according to claim 3, wherein the sensor unit is provided inside an outermost link of the multiple links.

5. The joint structure according to claim 2, wherein when an external force acts on the link structure in a direction in which the link structure is extended from the body part, the actuator is controlled to increase the tension applied to the first wire.

6. The joint structure according to claim 2, wherein when an object is provided in a direction in which the link structure is bent, the actuator is controlled to increase the tension applied to the first wire so that the link structure is bent toward the body part to grip the object.

7. The joint structure according to claim 1, wherein the reaction force providing portion includes a spring member.

8. The joint structure according to claim 1, wherein the actuator and the reaction force providing portion face each other with the body part disposed therebetween.

9. The joint structure according to claim 8, wherein the first wire and the second wire face each other with the link structure disposed therebetween.

10. The joint structure according to claim 1, wherein the second wire is connected to the outermost link of the multiple links.

11. The joint structure according to claim 1, wherein the sensor unit converts an analog signal generated by a change in the tension of the first wire into a digital signal.

12. The joint structure according to claim 11, wherein the sensor unit includes:
    a signal generating unit fixed to one end of the first wire and generating the analog signal; and
    a signal processing unit processing the signal by converting the analog signal received from the signal generating unit into the digital signal,
    the first wire extends through an internal space formed in the signal generating unit, and
    the analog signal is generated by a change in thickness of one component of the signal generating unit due to the change in the tension of the first wire.

13. The joint structure according to claim 12, wherein the sensor unit further includes a printed circuit board (PCB) provided under the signal generating unit and the signal processing unit, and the signal generating unit and the signal processing unit are attached to the PCB.

14. The joint structure according to claim 13, wherein the first wire extends through the PCB.

15. The joint structure according to claim 14, wherein the signal generating unit includes:
    an electrode attached to the PCB;
    a conductive plate spaced apart upwardly from the electrode; and
    a dielectric layer interposed between the electrode and the conductive plate, and attached to the electrode and the conductive plate, and
    the analog signal is generated by a change in thickness of the dielectric layer.

16. The joint structure according to claim 15, wherein the signal generating unit further includes a pressure plate provided on the conductive plate, and one end of the first wire is connected to the pressure plate.

17. A robot comprising a robotic arm,
    wherein the robotic arm includes a joint structure for performing a finger function of the robotic arm,
    the joint structure includes:
    a body part;
    a link structure connected to an upper portion of the body part and including multiple links;
    a sensor unit provided on one end of the link structure;
    a first wire having one end connected to the sensor unit;
    an actuator fixed to one side of the body part and connected to the other end of the first wire to move the other end of the first wire in a vertical direction,
    the sensor unit measures tension applied to the first wire;
    a second wire having one end connected to the link structure; and
    a reaction force providing portion fixed to the other side of the body part, connected to the other end of the second wire, and providing a force to pull the second wire downwardly.

* * * * *